US006951011B1

United States Patent
Sexton

(10) Patent No.: US 6,951,011 B1
(45) Date of Patent: Sep. 27, 2005

(54) DIAGNOSTIC METHOD AND ARTICLE FOR IDENTIFYING SIGNIFICANT EVENTS

(75) Inventor: Harlan Sexton, Palo Alto, CA (US)

(73) Assignee: Oracle International Corp., Redwood Shores, CA (US)

( * ) Notice: Subject to any disclaimer, the term of this patent is extended or adjusted under 35 U.S.C. 154(b) by 725 days.

(21) Appl. No.: 09/583,747

(22) Filed: May 31, 2000

Related U.S. Application Data

(60) Provisional application No. 60/185,139, filed on Feb. 25, 2000, provisional application No. 60/185,138, filed on Feb. 25, 2000, provisional application No. 60/185,137, filed on Feb. 25, 2000, provisional application No. 60/185,136, filed on Feb. 25, 2000, provisional application No. 60/185,135, filed on Feb. 25, 2000, provisional application No. 60/185,134, filed on Feb. 25, 2000, provisional application No. 60/160,759, filed on Oct. 21, 1999.

(51) Int. Cl.$^7$ .............................................. G06F 9/44
(52) U.S. Cl. .................. 717/124; 717/125; 717/127; 717/129; 717/131; 717/135
(58) Field of Search ............................... 717/124, 125, 717/127, 129, 131, 135

(56) References Cited

U.S. PATENT DOCUMENTS

| | | | | | |
|---|---|---|---|---|---|
| 4,945,474 A | * | 7/1990 | Elliott et al. | ................ | 707/202 |
| 5,265,254 A | * | 11/1993 | Blasciak et al. | ............ | 717/130 |
| 5,408,650 A | * | 4/1995 | Arsenault | .................... | 717/124 |
| 5,428,618 A | * | 6/1995 | Ueki et al. | ................... | 717/124 |
| 5,450,586 A | * | 9/1995 | Kuzara et al. | ............. | 717/124 |
| 5,612,898 A | * | 3/1997 | Huckins | .................... | 709/224 |
| 6,014,673 A | * | 1/2000 | Davis et al. | ................ | 707/202 |
| 6,353,924 B1 | * | 3/2002 | Ayers et al. | ................ | 717/128 |

\* cited by examiner

Primary Examiner—Todd Ingberg
Assistant Examiner—Qamrun Nahar
(74) Attorney, Agent, or Firm—Ditthavong & Carlson, PC

(57) ABSTRACT

Backtraces are logged in the log file during execution of a program and tagged with information that can categorize the backtraces. Certain tags are also marked as "interesting" in the log file. A report is generated from the log file, indicating which of the backtraces are associated with the tags marked as interesting. In one embodiment, allocations of objects are logged with their addresses, and the objects that are later migrated into session memory are marked interesting.

18 Claims, 3 Drawing Sheets

DIAGNOSTIC METHOD AND ARTICLE FOR IDENTIFYING SIGNIFICANT EVENTS

RELATED APPLICATIONS

The present application claims the benefit of the following U.S. Provisional Patent Applications, the contents of all of which are incorporated by reference in their entirety:

U.S. Provisional Patent Application Ser. No. 60/160,759 entitled USE OF A JAVA VM INSTANCE AS THE BASIC UNIT OF USER EXECUTION IN A SERVER ENVIRONMENT, filed on Oct. 21, 1999 by Harlan Sexton et al.;

U.S. Provisional Patent Application Ser. No. 60/185,136 entitled MEMORY MANAGEMENT USING MIGRATION FOR A RUN-TIME ENVIRONMENT, filed on Feb. 25, 2000 by Harlan Sexton et al.;

U.S. Provisional Patent Application Ser. No. 60/185,139 entitled METHOD AND ARTICLE FOR MANAGING REFERENCES BETWEEN OBJECTS IN MEMORIES OF DIFFERENT DURATIONS IN A RUN-TIME ENVIRONMENT, filed on Feb. 25, 2000 by Harlan Sexton;

U.S. Provisional Patent Application Ser. No. 60/185,138 entitled STATIC OBJECT SYSTEM AND METHODOLOGY FOR IMPLEMENTING A RUN-TIME ENVIRONMENT, filed on Feb. 25, 2000 by Harlan Sexton et al.;

U.S. Provisional Patent Application Ser. No. 60/185,134 entitled AURORA NATIVE COMPILATION, filed on Feb. 25, 2000 by Dmitry Nizhegorodov;

U.S. Provisional Patent Application Ser. No. 60/185,137 entitled ACCESSING SHORTER-DURATION INSTANCES OF ACTIVATABLE OBJECTS BASED ON OBJECT REFERENCES STORED IN LONGER-DURATION MEMORY, filed on Feb. 25, 2000 by Harlan Sexton et al.;

U.S. Provisional Patent Application Ser. No. 60/185,135 entitled HANDLING CALLOUTS MADE BY A MULTI-THREADED VIRTUAL MACHINE TO A SINGLE THREADED ENVIRONMENT, filed on Feb. 25, 2000 by Scott Meyer.

The present application is related to the following commonly-assigned, co-pending U.S. patent applications, the contents of all of which are incorporated by reference in their entirety:

U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al.;

U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999 by Harlan Sexton et al.;

U.S. patent application Ser. No. 09/248,294 entitled ADDRESS CALCULATION OF INVARIANT REFERENCES WITHIN A RUN-TIME ENVIRONMENT, filed on Feb. 11, 1999 by Harlan Sexton et al.;

U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al.;

U.S. patent application Ser. No. 09/320,578 entitled METHOD AND ARTICLE FOR ACCESSING SLOTS OF PAGED OBJECTS, filed on May 27, 1999 by Harlan Sexton et al.;

U.S. patent application Ser. No. 09/408,847 entitled METHOD AND ARTICLE FOR MANAGING REFERENCES TO EXTERNAL OBJECTS IN A RUNTIME ENVIRONMENT, filed on Sep. 30, 1999 by Harlan Sexton et al.;

U.S. patent application Ser. No. 09/512,619 entitled METHOD FOR MANAGING MEMORY USING EXPLICIT, LAZY INITALIZATION IN A RUN-TIME ENVIRONMENT, filed on Feb. 25, 2000 by Harlan Sexton et al.;

U.S. patent application Ser. No. 09/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al.;

U.S. patent application Ser. No. 09/512,621 entitled SYSTEM AND METHODOLOGY FOR SUPPORTING A PLATFORM INDEPENDENT OBJECT FORMAT FOR A RUN-TIME ENVIRONMENT, filed on Feb. 25, 2000 by Harlan Sexton et. al.;

U.S. patent application Ser. No. 09/512,618 entitled METHOD AND APPARATUS FOR MANAGING SHARED MEMORY IN A RUN-TIME ENVIRONMENT, filed on Feb. 25, 2000 by Harlan Sexton et al.; and U.S. patent application Ser. No. 09/512,620 entitled USING A VIRTUAL MACHINE INSTANCE AS THE BASIC UNIT OF USER EXECUTION IN A SERVER ENVIRONMENT, filed on Feb. 25, 2000 by Harlan Sexton et al.

FIELD OF THE INVENTION

The present invention relates to computer systems and more particularly to a debugging technique for identifying significant events.

BACKGROUND OF THE INVENTION

A dynamic run-time environment for a language such as JAVA™ is responsible for managing memory for objects that are created and destroyed during the execution of a program. An object is an entity that encapsulates data and, in some languages, operations associated with the object. Since the encapsulated data is stored in memory, objects are associated with particular regions of memory that are allocated and deallocated by the dynamic run-time environment.

The state of a program, or "program state," is the set of the objects and the references between the objects that exist at a specific point in time during the execution of the program. A "reference" is used by a run-time environment to identify and ultimately access the region of memory for storing the data of the object. Typically, references between objects in a run-time environment are encoded using machine pointers. A machine pointer is an instance of a native type that contains the address of the object in the main memory, which can be a real memory address or, more commonly, a virtual address on a machine that implements a virtual memory system.

One popular run-time environment is a JAVA™ virtual machine, which supports a platform-independent, object-oriented language developed by Sun Microsystems. In JAVA, the attributes and methods for a class of objects are typically defined in a source file, which is compiled into an architecture-neutral object file containing bytecodes that are interpreted in the virtual machine at the target platform. It is common for objects to reference other objects.

Lately, there has been much interest in using JAVA in a multi-user environment that allows multiple users to connect in separate, concurrent sessions to a server system, such as a relational database system. When designing a run-time environment for such a multi-user environment, scalability in terms of the number of simultaneous users who can establish separate sessions is very important. A significant constraint for user scalability is the size of the memory footprint that each session consumes. For example, a server system may have 100 Mb of memory for supporting all the user sessions. If the session memory footprint is 1 Mb, then only 100 users can be supported at one time. Therefore, it is desirable to reduce the session memory footprint to improve scalability.

One approach for reducing the session memory footprint is to provide a shorter duration memory named "call memory" that is active for the duration of a "call" but automatically deallocated when the call terminates. A call is the period of time, when the user is actively using the server, such as during execution of a SQL statement in a database server. Accordingly, those objects that do not need to live beyond the duration of the call are placed in the call memory rather than session memory. When the call is completed, objects in the call memory are deallocated and the call-duration memory is reclaimed for us. This approach has been implemented in Oracle Corporation's PL/SQL language, for instance, in which objects are explicitly declared as having the duration of a call or of a session. Memory management in such a language is straightforward because the objects are simply allocated in the memory that corresponds to their duration.

JAVA, however, defines the lifetime of many objects, especially system objects, to extend throughout the duration of a session and does not have the notion of a call or call duration in the programming model. Therefore, the run-time environment mush have a policy for using call memory. Accordingly, one approach is to simply ignore the provision of the call memory by the multi-user system and allocate every object in session memory, but this approach suffers from scalability because short-lived objects are unnecessarily allocated in session memory.

Another approach is to allocate objects first in the shorter-duration call memory, and then, at the time the call terminates, migrate the objects into the longer duration session memory. In this approach, session memory is consumed only if the object is still alive at the end of the call. JAVA, however, imposes restrictions on this approach by requiring several system classes to store large objects in static class variables. Use of static class variables is also common in user code. In many cases, the state of the these objects is no longer relevant after the call, but they are still considered alive at the end of the call. An example of one of these objects is an I/O buffer in a stream class, which holds no useful information after being flushed but still consumes several kilobytes.

Thus, the above-described migration policy causes these large objects to be migrated into session memory even though the state of the large object is no longer relevant, thereby increasing session memory requirements per session and reducing scalability. The space used by such objects is substantial, on the order of 150 Kb for a JAVA "Hello World" program, thereby seriously affecting the scalability of the system. Therefore, there is a need for improving the scalability of such run-time environments.

To address this need, we have developed several techniques for reducing the session memory footprint. In some of the techniques, we deallocate a large object that is easily recreatable at the end of call. This deallocation prevents the large object from being migrated to session memory. We also arrange for that that large object to be recreated, for example in call memory, when needed in the next call. Consequently, we avoid consuming valuable session memory for the large object and improve the scalability of the run-time environment.

Some of these techniques are described in greater detail in the co-pending, commonly assigned applications, U.S. patent application Ser. No. 9/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al. and U.S. patent application Ser. No. 09/512,619 entitled METHOD FOR MANAGING MEMORY USING EXPLICIT, LAZY INITALIZATION IN A RUN-TIME ENVIRONMENT, filed on Feb. 25, 2000 by Harlan Sexton et al., the contents of both of which are incorporated by reference in their entirety.

In order to use the above-described techniques, it is useful to affirmatively identify which objects are migrated into session memory. In a large run-time environment, such as a JAVA virtual machine, however, many objects are allocated and deallocated during the course of a call and it is difficult to identify, by manual inspection, those objects that would benefit most from applying such above-described techniques. Accordingly, there is a need for a diagnostic tool to identify these objects and, more generally, events of significance during execution of a program.

Conventional diagnostic tools, however, are unsatisfactory in addressing this need. For example, backtrace logging is form of performance monitoring that saves backtrace (i.e. a nested stack trace of the functions currently in effect) and symbol (e.g. the names of the functions) information obtained from a running program. The backtraces may be collected asynchronously, in response, for example, to an interrupt at short, uniform intervals, or synchronously, from calls to a system library. Normally, the backtraces are saved in a log file or files along with the symbol information used to interpret the backtraces. The logged information is then processed by another program, using the symbolic information, to merge the backtraces into a weighted tree and printed out. The following is an example of the kind of output produced by a backtrace logging tool:

```
1: _mainCRTStartup      98.84
  2: _main       98.83
    3: _ioe_external_test      97.53
      4: _do_call      97.53
        5: _ioe_execute      97.47
        5: _ioct_access_IU      0.06
    3: _ioe_init_call      1.30
      4: _eoa_startup_default_objmems      1.28
        5: _eoa_initialize_oldspace      1.21
        5: _eoa_initialize_sessionspace      0.03
        5: _eoa_initialize_runtime_space      0.01
        5: _eoa_init_weak_objects      0.01
        5: _eoa_initialize_stackspace      0.01
        5: _eoa_initialize_unscanned_stackspace      0.01
```

In this output, it is seen that, for the data set the program had been using, the call pattern is that main( ) calls ioe_external_test( ) and ioe_init_call( ), with most of the time (97.53%) belonging to processing the ioe_external_test( ) or its callees.

Backtrace logging can also be used to produced a static image of the dynamic allocation patterns from executing the problem, by synchronously collecting the backtraces from the system allocation routines. Each of the stack traces in this case would be weighted by the number of bytes being allocated. The log file of conventional backtrace logging contains thousands of backtraces, making manual inspection for particular events very difficult. Moreover, the report generated by conventional backtrace logging aggregates the backtraces into a single chart that obliterates the contribution of a particular backtrace from that of other backtraces.

Therefore, there is a need for a diagnostic tool that can be used to identify the allocation of objects that are migrated as well as other significant events of interest.

SUMMARY OF THE INVENTION

These and other needs are addressed by the present invention, in which each backtraces logged in the log file are also tagged during execution of a program with information that can categorize the backtraces. In addition, certain tags can also be marked as "interesting" in the log file during execution of the program. A report is generated from the log file, showing one or more of the backtraces associated with the interesting tags. Consequently, significant events can be automatically identified from a set of loggable events when the significance of the events can only be determined after the logging of the event occurs.

To be more specific, in one embodiment, backtraces are logged whenever a memory management routine to allocate memory for an object is called. These backtraces are also tagged with the starting address of allocated memory. This tag is not necessarily unique, because, as objects are allocated and deallocated, several objects over time may reuse the same allocated memory. When the objects are migrated at the end of a call, their starting address is marked in the backtrace log file as "interesting." Consequently, the generated report will show the backtraces associated with the allocation of objects that were later migrated. Thus, backtraces of migrated objects are produced when the objects were allocated, even though it can only be determined later that a particular allocated object was migrated to session memory.

Accordingly, one aspect of the invention relates to a method and software for analyzing a program, in which stack traces and tags are logged in a log file at points during execution of the program, and one or more interesting tags are marked within the log file. In one embodiment, the tags indicate addresses of allocated objects, and the interesting tags indicate the addresses of migrated objects.

Another aspect of the invention pertains to a method and software for producing a diagnostic report for a program, which includes accessing a log file recording stack traces and associated tags logged at points during execution of the program and as well as one or more interesting tags. The diagnostic report is generated from the log file.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A diagnostic method for identifying significant events is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
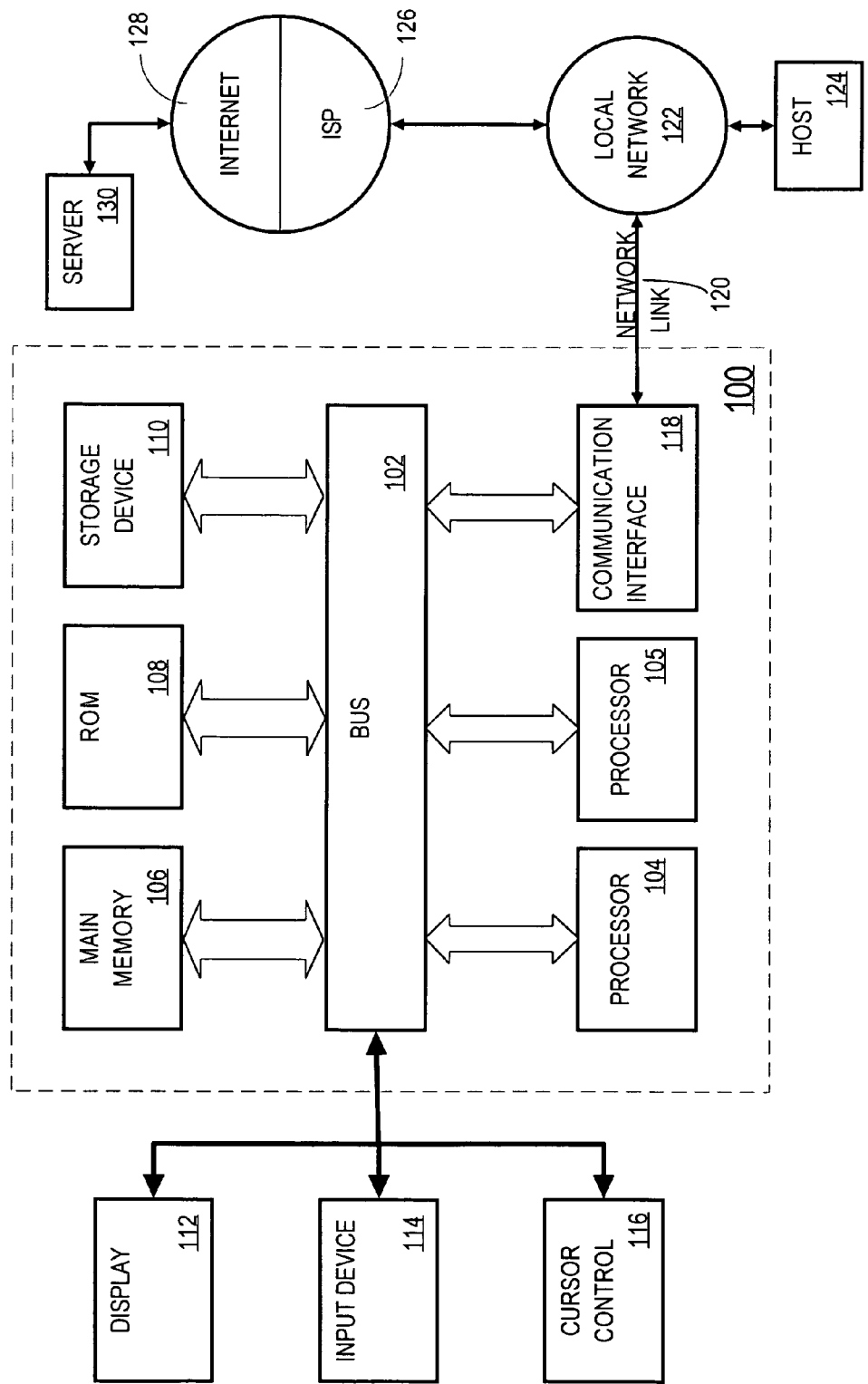
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for identifying significant events. According to one embodiment of the invention, identifying significant events is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for identifying significant events as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 100 on computer system 100, is preferably a random access storage device such as a magnetic or optical disk. Networked secondary storage is provided by storage devices on other computer systems, for example on host 124, accessible over a local area network 122, or server 130, accessible over a wide area network such as the Internet.

Memory Model

The operation of one embodiment of the present invention is illustrated with respect to a working example involving the identification of the creation of objects that will be migrated at the end of a call. Accordingly, a detailed description of the memory model for this working example is provided, but it is to be understood that the present invention is not limited to this working example nor to the use this memory model.

Figure 2:
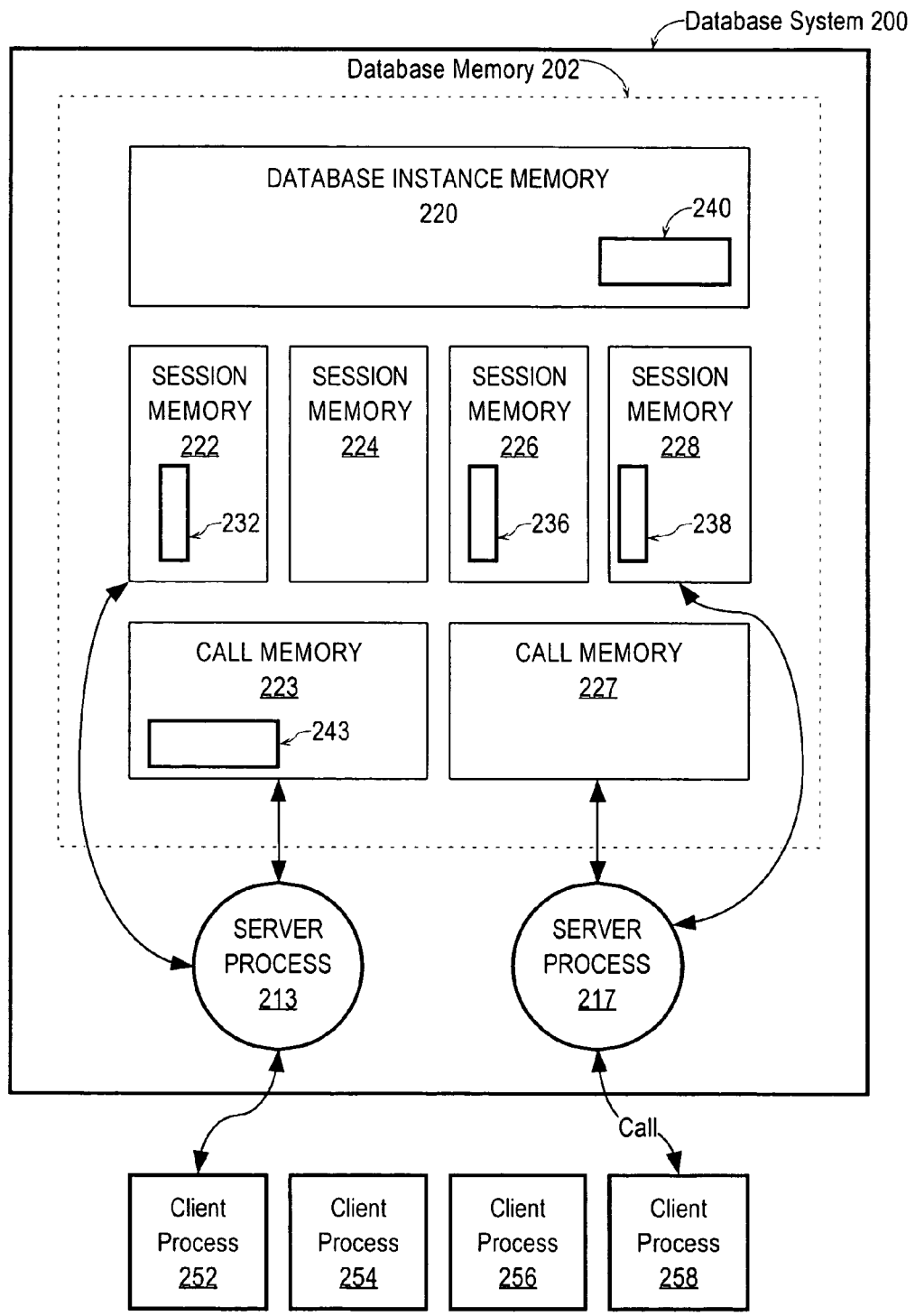
FIG. 2 is a schematic drawing of database server memory model for use with an embodiment.

FIG. 2 schematically illustrates a multi-user database system 200 with which a run-time environment for a language such as JAVA may be used, although the present invention is not limited to multi-user database systems in particular and may be applied to other multi-user systems. In the illustrated configuration, client processes 252, 254, 256, and 258 establish database sessions with the database system 200. A database session refers to the establishment of a connection between a client and a database system through which a series a calls may be made. As long as the client remains connected in the database session, the client and the associated database session are referred to as being active. Active clients can submit calls to the database system 200 to request the database system 200 to perform tasks. One example of a call is a query in accordance with the Structured Query Language (SQL), and another example is a method invocation of a JAVA object or class, defined for performing a database task for database system 200.

Database system 200 comprises, among other components, a database memory 202 for storing information useful for processing calls and a number of server processes 213 and 217 for handling individual calls. The database memory 202 includes various memory areas used to store data used by server processes 213 and 217. These memory areas include a database instance memory 220, session memories 222, 224, 226, and 228, and call memories 223 and 227. It is to be understood that the number of the session memories and call memories in FIG. 2 is merely illustrative and, in fact, the number of such memories will vary over time as various clients make various calls to the database system 200.

The database instance memory 220 is a shared memory area for storing data that is shared concurrently by more than one process. For example, shared memory area may be used store the read-only data and instructions (e.g. bytecodes of JAVA classes) that are executed by the server processes 213 and 217. The database instance memory 220 is typically allocated and initialized at boot time of the database system 200, before clients connect to the database system 200.

When a database session is created, an area of the database memory 202 is allocated to store information for the database session. As illustrated in FIG. 2, session memories 222, 224, 226, and 228 have been allocated for clients 252, 254, 256, and 258, respectively, for each of which a separate database session has been created. Session memories 222, 224, 226, and 228 are a shared memory used to store static data, ie., data associated with a user that is preserved for the duration of a series of calls, especially between calls issued by a client during a single database session. JAVA static class variables are one example of such static data.

A call memory, such as call memory 227, is used to store data that is bounded by the lifetime of a call. When client 258 submits a call to the database system 200, one of server processes 213 or 217 is assigned to process the call. For the duration of the call, the server process is allocated a call memory for storing data and other information for use in processing the call. For example, server process 217 uses call memory 227 and session memory 228 for processing a call submitted by client process 258.

At any given time, a server process is assigned to process a call submitted by a single client. After the server process completes its processing of a call from one client, the server process is free to be assigned to respond to the call of another client. Thus, over a period of time, a server process may be assigned to process calls from multiple clients, and a client may use multiple server processes to handles its various calls. The number of calls requiring execution by a server process is typically much fewer than the current number of active clients. Thus, database system 200 is typically configured to execute fewer server processes than the maximum number of active clients.

Tagged Backtrace Logging

Figure 3:
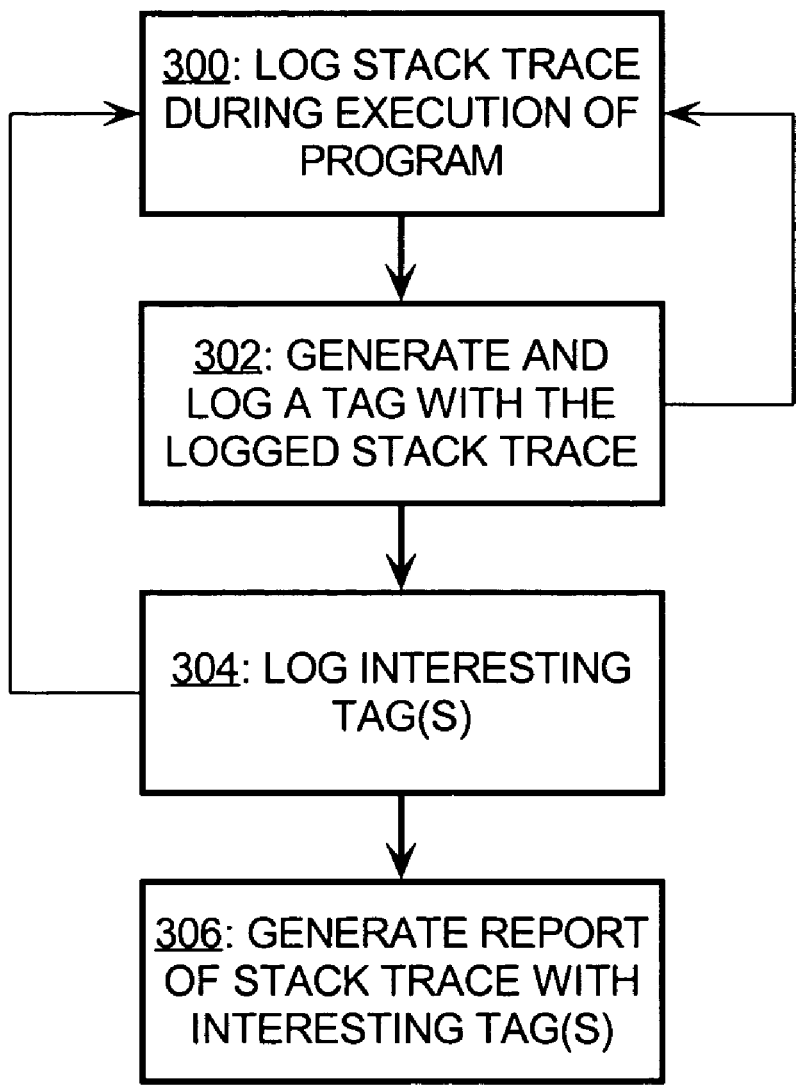
FIG. 3 is a flow diagram of diagnosing a program for identifying significant events in accordance with one embodiment of the present invention.

FIG. 3 is a flow diagram of diagnosing a program for identifying significant events in accordance with one embodiment of the present invention. For purposes of convenience, the operation of FIG. 3 will be illustrated with respect to identifying the allocation of objects that are later migrated into session memory, although it is to be understood that the present invention is not so limited.

At block 300, the program under diagnosis, such as a JAVA virtual machine, is executed, during which a stack trace is logged to a backtrace log file at a point during execution of the program. In one embodiment, the stack trace information is collected synchronously, when one or more specified routines are called. In the working example of identifying the allocation of objects that are later migrated into session memory, the memory management routines that allocate objects are configured to trigger the logging of a stack trace.

In one embodiment, when a stack trace is logged, a delimiter is written to the backtrace log file to distinguish between different stack traces in the file. Then the current stack is traced, frame by frame, starting from the stack frame for the current function (e.g. a memory allocation routine) and repeatedly moving up the stack to each calling function until the "root" function is reached. For each stack frame, an indication of the function that set up the stack frame is recorded, preferably as a program counter address to avoid the run-time overhead of finding the symbolic name for the function. The exact nature of the stack frames is machine-specific and will therefore vary from computer platform to computer platform, but specification for the stack frames for any particular platform is known and producing the stack traces can readily be implemented from the stack frame specification.

In the working example, one of the stack traces may be written as follows (with program counter values replaced by their symbolic equivalents to purposes of readability):

[backtrace delimiter]
[alloc( ) frame]
[baz( ) frame]
[foo( ) frame]
[main( ) frame]

In this example, invocation of the alloc( ) function triggered the data collection event for the backtrace logging, and a frame for the alloc( ) function was logged, as well as a frame for the function that called alloc( ), namely baz( ). In tracing further up the stack, the foo( ) function is logged showing that foo( ) called baz( ), and finally the stack frame of main( ), the standard C entry point, was logged. Not shown in the example, but present in some embodiments, a "weight" indication can also be logged to indicate, for example, how many bytes were allocated, which helps identify large objects.

After the stack trace has been laid down in the backtrace log file, a tag is generated in block 302 and logged in association with (e.g., immediately after) the logged stack trace. The tag value can be any value that will help subcategorize the various stack traces and will generally be some parameter available to the routine that triggered the backtrace logging event. In the working example, for instance, the tag value is the address of the object that was just allocated in the allocation routine, and the following backtrace would be logged (include the portion logged in block 300), if the object was allocated at address 0x12345678:

[backtrace delimiter]
[alloc( ) frame]
[baz( ) frame]
[foo( ) frame]
[main( ) frame]
[tag 0x12345678]

After the tag has been logged for the stack frame, execution of the program continues, which may cause additional stack traces to be generated as they are triggered. Thus, blocks 300 and 302 may be executed many times. For example, it is possible for the object allocated at address 0x12345678 by the baz( ) function to be deallocated. Later, the memory at address 0x12345678 is reused in a memory allocated in a function called interesting2( ). This event may be logged as in the following:

[backtrace delimiter]
[alloc( ) frame]
[interesting2( ) frame]
[interesting1( ) frame]
[main( ) frame]
[tag 0=12345678]

At block 304, those tags that are considered "interesting" are marked in the backtrace log file. An interesting tag is associated with the occurrence of a significant event, i.e. the event the cause of which one is attempting to ascertain in using this diagnostic tool. In the working example, the significant event is the migration of an object into session memory, and ascertaining the cause of this event, i.e. the allocation of the object originally, would be useful in determining whether to apply a session memory reduction technique on the object. Accordingly, the interesting tag, in this example, would be the address of the object that was migrated.

In one embodiment, to mark an interesting tag, a delimiter is placed in the log file, followed by the interesting tag. Further information about the interest of the tag can also be recorded, for example, to specify that only the last occurrence of the tag in the backtrace log file is interesting or that all occurrences of the tag are interesting. For the case of identifying the allocation of objects that are later migrated into session memory, only the last allocation of memory at the address of the migrated object is interesting, because the previous allocations were freed and therefore did not result in an object being migrated into session memory. In the working example, if the object at address 0x12345678 was migrated, then the following indication is placed in the backtrace log file, where the "MARK TAG ONCE" indicates that only the last occurrence of this tag is interesting:

[backtrace delimiter]
[MARK TAG ONCE 0x12345678]

Another indication that can be used is a "MARK TAG ALL," which means that all occurrences of the tag are interesting. Block 304 may be performed multiple times and may even be interspersed with the logging that occurs in blocks 300 and 304. After the program has run, the entire log file, preferably in conjunction with a symbol table for the program, is processed to generate a report of the interesting stack frames.

In one embodiment, for simplicity of processing, the backtrace log file is processed from the end backward until the beginning. Accordingly, when a "MARK TAG ONCE" entry is detected, that tag is recorded in a data structure such as a hash table. As stack traces are encountered, the data structure is checked. If the data structure lacks an indication corresponding to the tag, then the stack trace is not produced for the report. On the other hand, when the tag is encountered, the associated stack trace is produced for the report. If the entry is "MARK TAG ONCE" (but not "MARK TAG ALL"), then the corresponding entry in the data structure is removed so that subsequent tags of the same value will not be produced for the report. When the backtrace log file is processed from the end backwards, a "MARK TAG ONCE" results in the last stack trace with the associated tag being produced but not the earlier stack traces, because the first stack trace in the backwards direction is the last stack trace in the forwards direction.

In the example, the tag 0x12345678 was marked as "MARK TAG ONCE." Thus only the last entry with that tag in the backtrace log file is produced for the report, e.g. the allocation in the interesting2( ) function is noted but not the allocation in the baz( ) function. As a result, a system programmer would then inspect the interesting2( ) function, without wasting effort in the baz( ) function, to determine whether techniques to reduce session memory can profitably be applied.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method for analyzing a program, comprising the steps of:
    logging a plurality of stack traces and respective tags in a log file at respective points during execution of the program; and
    recording within the log file one or more of the tags as one or more marked tags, wherein the tags indicate respective addresses of allocated objects; and
    the one or more marked tags indicate one or more respective addresses of migrated objects.

2. The method according to claim 1, further comprising the step of:
    producing a report based on the log file.

3. The method according to claim 2, wherein the step of producing the report includes:
    identifying one or more of the stack traces that are associated with any of the one or more tags marked; and
    producing the report based on the identified one or more of the stack traces.

4. The method according to claim 2, wherein producing the report includes:
    identifying a last stack trace that is associated with one of the one or more marked tags; and
    producing the report based on the identified last stack trace.

5. The method according to claim 4, wherein the step of producing the report includes:
    processing the log file from the end backward until the beginning.

6. A method for producing a diagnostic report for a program, comprising the steps of:
    accessing a log file comprising a list of stack traces and respective tags at associated points during execution of the program and comprising one or more marked tags; and producing the diagnostic report based on the log file, wherein the tags indicate respective addresses of allocated objects; and the one or more marked tags indicate one or more respective addresses of migrated objects.

7. The method according to claim 6, wherein the step of producing the report includes:
identifying one or more of the stack traces that are associated with any of the one or more marked tags; and
producing the report based on the identified one or more of the stack traces.

8. The method according to claim 6, wherein producing the report includes:
identifying a last stack trace that is associated with one of the one or more marked tags; and
producing the report based on the identified last stack trace.

9. The method according to claim 8, wherein the step of producing the report includes:
processing the log file from the end backward until the beginning.

10. A computer-readable medium bearing instructions for analyzing a program, said instructions being arranged to cause one or more processors upon execution thereby to perform the steps of:
logging a plurality of stack traces and respective tags in a log file at respective points during execution of the program; and
recording within the log file one or more of the tags as one or more marked tags, wherein the tags indicate respective addresses of allocated objects; and
the one or more marked tags indicate one or more respective addresses of migrated objects.

11. The computer-readable medium according to claim 10, further bearing instructions for performing the step of:
producing a report based on the log file.

12. The computer-readable medium according to claim 11, wherein the step of producing the report includes:
identifying one or more of the stack traces that are associated with any of the one or more marked tags; and
producing the report based on the identified one or more of the stack traces.

13. The computer-readable medium according to claim 11, wherein producing the report includes:
identifying a last stack trace that is associated with one of the one or more marked tags; and
producing the report based on the identified last stack trace.

14. The computer-readable medium according to claim 13, wherein the step of producing the report includes:
processing the log file from the end backward until the beginning.

15. A computer-readable medium bearing instructions for producing a diagnostic report for a program, said instructions being arranged to cause one or more processors upon execution thereby to perform the steps of:
accessing a log file comprising a list of stack traces and respective tags at associated points during execution of the program and comprising one or more marked tags; and
producing the diagnostic report based on the log file, wherein the tags indicate respective addresses of allocated objects; and
the one or more marked tags indicate one or more respective addresses of migrated objects.

16. The computer-readable medium according to claim 15, wherein the step of producing the report includes:
identifying one or more of the stack traces that are associated with any of the one or more marked tags; and
producing the report based on the identified one or more of the stack traces.

17. The computer-readable medium according to claim 15, wherein producing the report includes:
identifying a last stack trace that is associated with one of the one or more marked tags; and
producing the report based on the identified last stack trace.

18. The computer-readable medium according to claim 17, wherein the step of producing the report include:
processing the log file from the end backward until the beginning.

* * * * *

UNITED STATES PATENT AND TRADEMARK OFFICE
CERTIFICATE OF CORRECTION

PATENT NO. : 6,951,011 B1
DATED : September 27, 2005
INVENTOR(S) : Harlan Sexton It is certified that error appears in the above-identified patent and that said Letters Patent is hereby corrected as shown below:

<u>Title page,</u>
Item [54], Title, delete "DIAGNOSTIC METHOD AND ARTICLE FOR IDENTIFYING SIGNIFICANT EVENTS" and insert -- DIAGNOSTIC METHOD AND APPARATUS FOR IDENTIFYING SIGNIFICANT EVENTS --.

Signed and Sealed this

Twenty-ninth Day of November, 2005

JON W. DUDAS
*Director of the United States Patent and Trademark Office*